United States Patent
Genuit et al.

[15] 3,656,052
[45] Apr. 11, 1972

[54] APPARATUS FOR PROVIDING REGULATED VOLTAGE DURING BRIEF POWER INTERRUPTIONS

[72] Inventors: Luther L. Genuit, Scottsdale; John R. Nowell, Phoenix, both of Ariz.

[73] Assignee: Honeywell Information Systems Inc., Waltham, Mass.

[22] Filed: Jan. 4, 1971

[21] Appl. No.: 103,625

[52] U.S. Cl. .................................323/17, 320/1, 321/20, 323/22 SC, 323/DIG. 1
[51] Int. Cl. .................................G05f 1/56, G05f 1/62
[58] Field of Search............320/1; 323/9, 17, DIG. 1, 22 T, 323/22 SC; 321/2, 20

[56] References Cited

UNITED STATES PATENTS 3,328,674  6/1967  Bleicher................................323/17
3,579,091  5/1971  Clarke..............................323/DIG. 1
3,585,491  6/1971  Petersen................................323/9

FOREIGN PATENTS OR APPLICATIONS 980,738  1965  Great Britain......................323/17

Primary Examiner—Gerald Goldberg
Attorney—Fred Jacob and Edward W. Hughes

[57] ABSTRACT

A plurality of voltage boosters connected to a D.C. power supply each stores a quantity of electrical charge while the power supply provides a regulated value of output voltage. When the output voltage of the supply decreases below a predetermined value the boosters are sequentially connected to the D.C. supply and return substantially all of the stored charges to the supply, so that the output voltage increases to the regulated value.

9 Claims, 2 Drawing Figures

Patented April 11, 1972

INVENTOR
LUTHER L. GENUIT
JOHN R. NOWELL
BY
Lloyd B. Guernsey
AGENT

Patented April 11, 1972

INVENTOR.
LUTHER L. GENUIT
JOHN R. NOWELL
BY
Lloyd B. Guernsey

AGENT 3,656,052

APPARATUS FOR PROVIDING REGULATED VOLTAGE DURING BRIEF POWER INTERRUPTIONS

BACKGROUND OF THE INVENTION

This invention relates to power supplies and more particularly to apparatus for providing a regulated voltage during the brief time that the power to the regular D.C. supply may be interrupted.

In high-speed data processing systems any decrease in the D.C. power supply voltage below a predetermined value may cause the loss of important data which is stored in the processing system. To prevent this loss of data elaborate "shut down" procedures are used in the processing system. The shutdown procedure and the "start up" procedure, when power is restored, each require a relatively long time duration so that the valuable processing time is lost in the data processing system. It is desired that apparatus be provided to prevent brief interruptions of power on the A.C. power line from causing a decrease in the D.C. power supply voltage.

Prior art circuits employ a plurality of large capacitors connected across the output terminals of the D.C. power supply. These large capacitors store large quantities of electrical charge when the D.C. power supply provides a regulated value of power supply voltage. When power on the D.C. line is interrupted the large capacitors provide power for the data processing system for a brief period of time. These capacitors are large, bulky and expensive. Also only a small portion of the charge stored on these capacitors is used because the voltage across the capacitors decreases as the charge on the capacitor is decreased. For example, when the regulated or normal voltage of a D.C. power supply is 100 volts and the lowest operating voltage of the processing system is 90 volts, only 10 percent of the charge on these capacitors can be used by the system before the system is shut down.

The present invention alleviates the disadvantages of the prior art by using a much smaller filter capacitor across the output terminals of the D.C. power supply and by supplying additional quantities of electrical charge to this capacitor when the voltage decreases to a predetermined value, such as 92 volts. These additional quantities of electrical charge are supplied by a plurality of voltage booster circuits comprising booster capacitors. Each of the voltage booster circuits obtains a quantity of electrical charge from a D.C. power supply when the power supply is operating at a regulated value of voltage and then returns substantially all of this electrical charge to the filter capacitor when the voltage across the output terminals decreases to a predetermined value. The smaller filter capacitor requires a smaller quantity of electrical charge to increase the voltage to the regulated value, so that the present invention may use relatively small booster capacitors.

It is, therefore, an object of this invention to provide apparatus which enables a power supply to provide a regulated D.C. voltage during brief interruptions in the voltage from an A.C. power source.

Another object of this invention is to provide apparatus which enables a power supply to provide a regulated D.C. voltage during A.C. power interruptions of a predetermined time duration.

A further object of this invention is to provide a compact apparatus which enables a power supply to provide a regulated D.C. voltage during brief interruptions in the voltage from an A.C. power source.

Another object of this invention is to provide a more efficient apparatus which enables a power supply to provide a regulated D.C. voltage during brief interruptions in the voltage from an A.C. power source.

SUMMARY OF THE INVENTION

The foregoing objects are achieved in accordance with one embodiment of the present invention by employing a constant voltage source, a voltage comparator, a pulse generator, a sequencer and a plurality of voltage boosters. The voltage comparator compares the output voltage of the D.C. power supply with a constant voltage source and provides an enabling pulse to the pulse generator when the voltage of the power supply decreases below a predetermined value. The enabling signal causes the pulse generator to provide pulses to the sequencer which causes the voltage boosters to sequentially supply electrical charges to the output filter capacitor of the D.C. power supply.

Other objects and advantages of this invention will become apparent from the following description when taken in connection with the accompanying drawings.

DESCRIPTION OF THE PREFERRED EMBODIMENT

Figure 1:
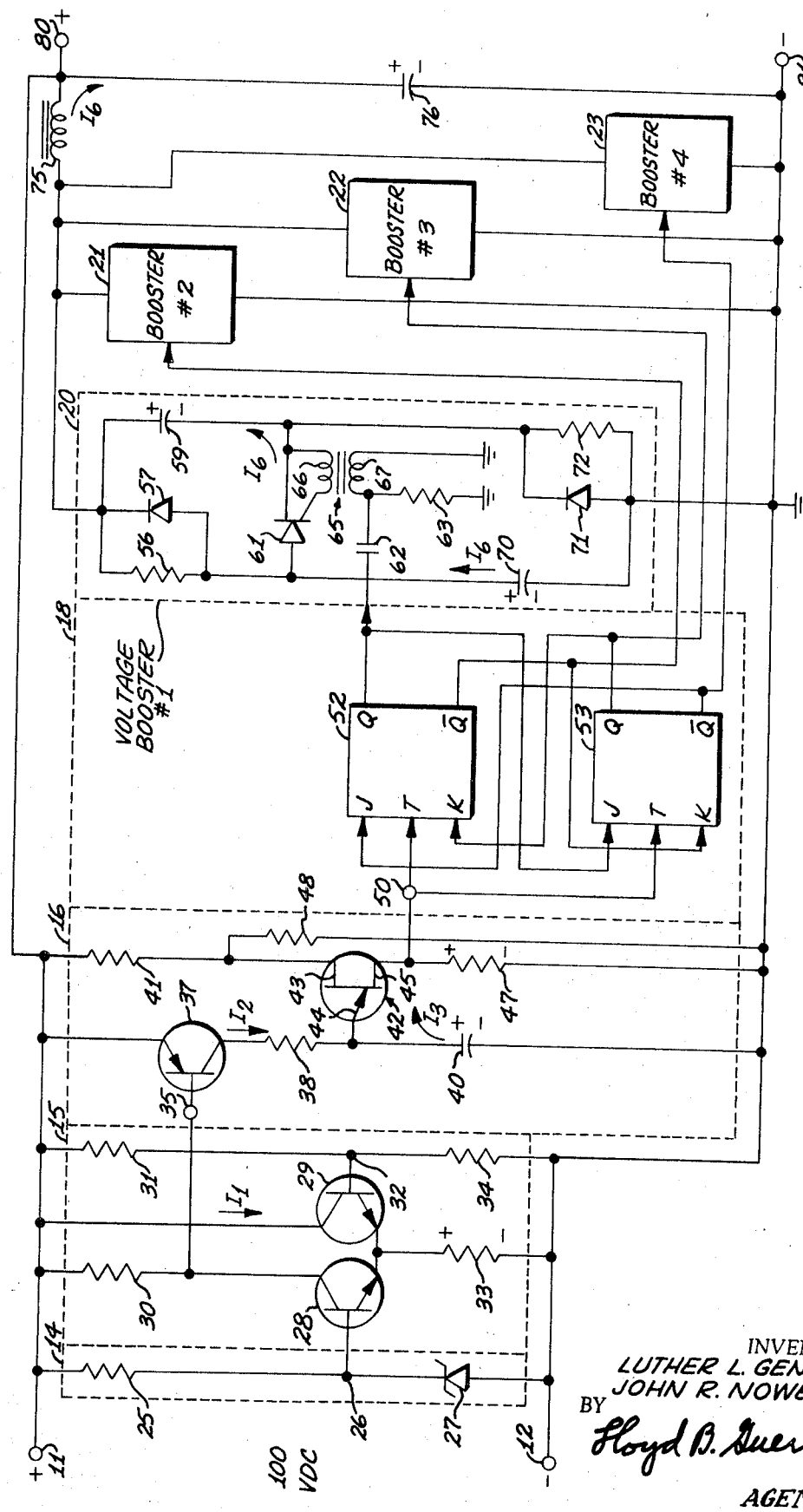
FIG. 1 is a schematic diagram of one embodiment of the instant invention.
Figure 2:
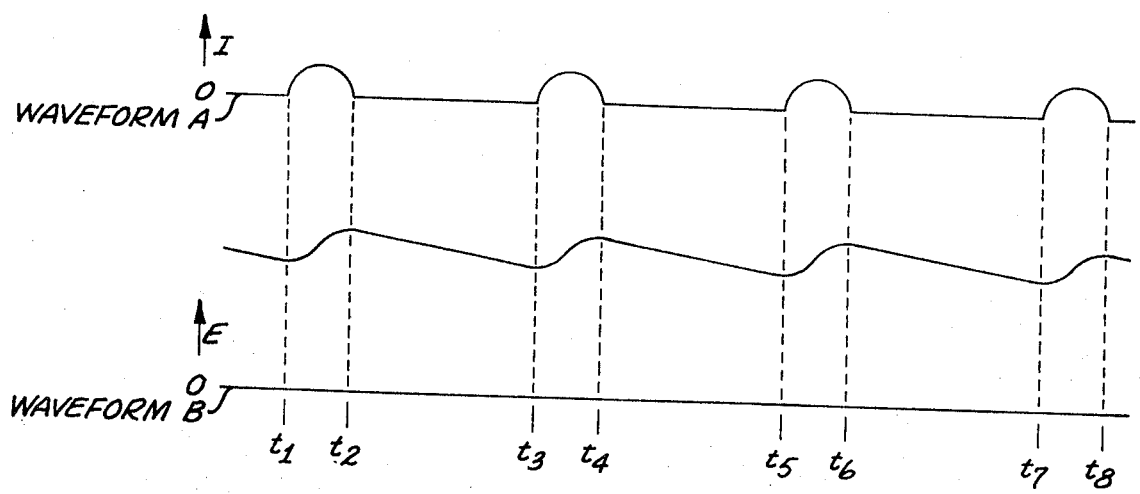
FIG. 2 illustrates waveforms which are useful in explaining the operation of the circuit shown in FIG. 1.

Referring more particularly to the drawings by characters of reference, Fig. 1 discloses apparatus which is designed to provide a regulated D.C. voltage during brief power interruptions. As indicated in FIG. 1, a comparator circuit 15 is coupled to a constant-voltage source 14 and to the voltage-input terminals 11 and 12 of the D.C. power supply. Comparator circuit 15 is connected to a relaxation oscillator 16 and controls the operation of the relaxation oscillator in response to the difference between the voltage at terminal 11 and a reference voltage from the constant-voltage source. Relaxation oscillator 16 in turn develops trigger pulses for a sequencer 18 which sequentially provides positive trigger pulses to voltage boosters 20, 21, 22 and 23. The power supply, a resistor 25 and a Zener diode 27 provide a constant voltage with respect to ground at junction point 26. The Zener diode has a characteristic of providing a constant voltage drop across its terminals for a wide range of amplitude of currents flowing through the diode in a reverse direction. Therefore the voltage difference between junction point 26 and ground will be constant.

Oscillator 16 includes a transistor 37, a resistor 38 and a capacitor 40 connected in series between the positive terminal 11 and the negative terminal 12 of the D.C. power supply. A unijunction transistor 42 has an emitter 44 connected to the junction point between resistor 38 and capacitor 40. Resistors 41 and 48 are connected in series between terminal 11 and terminal 12 to form a voltage divider to provide a predetermined value of voltage between a second base 43 of the unijunction transistor 42 and ground. A resistor 47 is connected between a first base 45 of transistor 42 and a negative terminal 12 of the D.C. power supply.

A unijunction transistor is a semiconductor device having a first base or "base one", a second base or "base two" and an emitter. If a positive voltage exists between base two and base one, the unijunction transistor cannot conduct current between the emitter and base one until a voltage greater than a predetermined threshold or "peak point voltage" value exists between the emitter and base one. When the voltage on the emitter is more than the peak point voltage, current flows from an emitter to base one until the emitter voltage decreases below a second predetermined or "valley voltage" value. A more detailed description of a unijunction transistor can be found in chapter 13 of the Transistor Manual, 6th Edition, 1962, published by the General Electric Company, Syracuse, New York.

When the voltage at terminal 11 is greater than a predetermined value such as a +92V., the voltage at the junction point 32, connected to the base of transistor 29, is greater than the voltage at junction point 26 which is connected to the base of transistor 28, so that transistor 29 is rendered conductive. When transistor 29 is conductive a current $I_1$ flows from terminal 11 through collector to emitter of transistor 29, through resistor 33 to voltage-input terminal 12. Current $I_1$ provides a voltage drop of the polarity shown across resistor 33. The voltage drop across resistor 33 is greater than the voltage potential at junction point 26 so that the voltage at the emitter of the transistor 28 is more positive than the voltage at the base of transistor 28 thereby rendering transistor 28 non-conductive. When transistor 28 is non-conductive the voltage at the collector of transistor 28 and at the base of transistor 37 is substantially the same as the voltage at the voltage-input terminal 11. Thus, the voltage at the base of transistor 37 is substantially the same as the voltage at the emitter of transistor 37 so that transistor 37 is rendered non-conductive, no current flows through transistor 37 and capacitor 40 does not charge. Since there is no charge on capacitor 40 the voltage on the emitter 44 of the unijunction transistor 42 will not be large enough to cause transistor 42 to conduct and the pulse generator will be rendered inoperative.

The sequencer 18 comprises a pair of J-K flip-flops, 52 and 53, with the Q output lead of flip-flop 52 connected to the J input lead of flip-flop 53 and the $\overline{Q}$ output lead of flip-flop 52 connected to the K input lead of flip-flop 53. The T or trigger input leads of flip-flops 52 and 53 are each connected to the signal-input terminal 50 which is connected to the base one of the unijunction transistor 42.

The J-K flip-flop or bistable multivibrator referred to in the specifications and shown in FIG. 1 is a circuit adapted to operate in either one of two stable states and transfer from the state in which it is operating to the other stable state upon the application of a trigger signal thereto. In one state of operation the J-K flip-flop represents a binary 1 (1-state) and in the other state, the binary 0 (0-state). The three leads entering the left side of the flip-flop symbol, for example, flip-flop 52, provide the required trigger signals. The upper lead, the J lead, provides a set signal, the lower lead, the K lead, provides a reset input signal and the center lead provides the trigger signal. When the set input signal on the J lead, is positive and the reset signal, on the K lead is zero, a positive trigger signal on the T lead causes the flip-flop to change to the 1-state, if it is not already in the 1-state. When the reset signal on the K lead is positive and the set signal on the J lead is zero, a trigger signal causes the flip-flop to transfer to the 0-state if it is not already in the 0-state. The two leads leaving the right hand side of the flip-flop deliver the output signal for each flip-flop. The upper output lead, the Q lead, delivers the one output signal of the flip-flop and the $\overline{Q}$ delivers the zero output signal.

The sequencer 18 receives pulses from the pulse generator 16 and sequentially provides output pulses to the voltage boosters 20, 21, 22 and 23. The flip-flops 52 and 53 are cross-coupled so that only one of the four output leads from these two flip-flops provides a positive going signal at a given period of time and these four leads provide output signals in sequence to the four voltage boosters. For example, let us assume that both flip-flop 52 and flip-flop 53 are in the 0-state when the first pulse is received at signal-input terminal 50. When the flip-flops are in the 0-state a positive voltage is provided at the $\overline{Q}$ output lead of each of the flip-flops 52 and 53. The positive voltage from the $\overline{Q}$ output lead of flip-flop 53 which is coupled to the J input lead of flip-flop 52 and the trigger signal from terminal 50 applied to the T input lead of flip-flop 52 cause the flip-flop 52 to be set so that a positive going voltage from the Q output lead is coupled to the input lead of voltage booster No. 1. When the next positive pulse from the pulse generator is applied to the signal input terminal 50 the positive voltage from the Q output lead of flip-flop 52 which is coupled to the J input lead of flip-flop 53 and the trigger signal from terminal 50 causes flip-flop 53 to be set in the 1-state so that a positive going voltage appears at the Q output lead of flip-flop 53. This positive going voltage from the Q output lead of flip-flop 53 provides a positive trigger signal to the voltage booster 22. When the third pulse from the pulse generator is applied to input terminal 50 the positive voltage from the Q output lead of flip-flop 53 applied to the K input lead of flip-flop 52 and the trigger signal applied to flip-flop 52 causes this flip-flop to be reset so that a positive going voltage appears at the $\overline{Q}$ output lead thereby providing a positive pulse to the voltage booster 21. When the fourth input pulse appears at input terminal 50 the positive voltage from the $\overline{Q}$ output lead of flip-flop 52 and the trigger signal cause flip-flop 53 to be reset so that a positive going voltage from the $\overline{Q}$ output lead of flip-flop 53 provides a trigger pulse to voltage booster 23. Thus, it can be seen that a positive trigger pulse is sequentially applied to each one of the voltage boosters 20–23 in succession so that these voltage boosters will be triggered.

Each of the voltage boosters 21–23 comprises a circuit which is identical to that shown in the voltage booster 20. Each voltage booster comprises a pair of resistors 56 and 72, a pair of capacitors 59 and 70, a transformer 65 and a silicon controlled rectifier SCR 61. The SCR 61 shown in FIG. 1 is a semiconductor device having an anode, a cathode and a gate. The SCR can be used as an ON-OFF switch which can be turned on in a very few microseconds. Normally, the SCR cannot conduct current between anode and cathode thereof until a pulse of current larger than a threshold value flows from gate to cathode. If a positive voltage difference exists between the anode and cathode when a pulse of current flows in the gate, the SCR "fires"; i.e., is rendered conductive and the current will flow from the anode to the cathode. Once anode-cathode flow commences, the gate has no further control over such current flow. Current flow from anode to cathode and the SCR can be terminated only by reducing the anode to cathode current below a "holding" or minimum current value. A more detailed description of the operation of an SCR can be found in the Silicon Controlled Rectifier Manual, 4th Edition, 1967, published by The General Electric Company, Syracuse, New York.

The operation of voltage booster 20 will be described in detail but it should be understood that the other voltage boosters 21–23 operate in the same manner as voltage booster No. 20. Prior to the time that the pulse generator develops pulses which are coupled to the sequencer the voltage at the voltage-input terminal 11 is above a predetermined or threshold value. At this time the capacitors 59 and 70 in the voltage booster charge to the polarity shown. Current from the voltage-input terminal 11 flows through resistor 56 to the upper plate of capacitor 70 from the lower plate of capacitor 70 to the voltage-input terminal 12, thereby charging capacitor 70 to the polarity shown in FIG. 1. Current flows from terminal 11 to the upper plate of capacitor 59, from the lower plate of capacitor 59 through resistor 72 to input terminal 12 thereby charging capacitor 9 to the polarity shown in FIG. 1. The voltage across capacitor 59 and the voltage across capacitor 70 will each be equal to the voltage at voltage-input terminal 11, which is shown in this example to be 100 volts.

When the voltage at terminal 11 decreases to the threshold value the sequencer 18 provides a positive going voltage to the input lead of voltage booster 20 so that a current flows from the input lead to the left side of capacitor 62, from the right side of capacitor 62 through primary 67 of transformer 65 to ground, thereby providing a pulse of voltage across a secondary winding 66. The voltage across the secondary winding 66 provides a positive pulse of voltage at the gate of the SCR 61 so that the SCR 61 is rendered conductive. When SCR 61 is rendered conductive a current $I_6$ flows from the upper plate of capacitor 70, through anode to cathode of SCR 61 to the lower plate of capacitor 59, from the upper plate of capacitor 59 through inductor 75 to the upper plate of capacitor 76, from the lower plate of capacitor 76 to the lower plate of capacitor 70, thereby providing an increase in the quantity of charge on capacitor 76. When current $I_6$ flows through inductor 75 energy is stored in the form of a magnetic field in the core of inductor 75. When the current $I_6$ starts to decrease the energy stored in the core of the inductor is returned to the circuit thereby causing the current to continue flowing in the circuit. The energy stored in the magnetic field of inductor 75 causes substantially all of the charge previously stored on capacitors 59 and 70 to be removed from these capacitors and to be stored on the output filter capacitor 76.

Diodes 57 and 71 in the voltage booster are used to prevent the capacitors 70 and 59 from retaining a value of voltage greater than the regulated value of voltage at terminal 80 when power is restored. When power is restored and the voltage at terminal 80 may temporarily increase to a value greater than the regulated value of voltage so that capacitors 59 and 70 may charge to a voltage greater than the regulated value. When the voltage at terminal 80 returns to the regulated value the extra voltage on capacitors 59 and 70 cause currents to flow through diodes 71 and 57 respectively so that the voltage on capacitors 59 and 70 quickly returns to the regulated value.

The circuit shown in FIG. 1 can readily be expanded to include a much greater number of voltage boosters. For example, four more sequencers of the type shown and twelve more voltage boosters can be used. The four output leads of the sequencer 18 shown in FIG. 1 may each be connected to one of the input leads of the four added sequencers. The sixteen output leads of the added sequencers may each be connected to an input lead of a corresponding one of the sixteen voltage boosters. It can be seen that even more sequencers and more voltage boosters may be added to the circuit of FIG. 1 to provide more electrical charge for filter capacitor 76 so that power interruptions of longer time duration may be tolerated on the A.C. power lines.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modification, within the limits only of the true spirit and scope of the invention.

What is claimed is:

1. Apparatus for providing a regulated voltage during brief power interruptions for use with a D.C. power supply which delivers current to an output filter capacitor, said apparatus comprising:
    a comparator circuit;
    a constant-voltage source, said comparator circuit being connected to said filter capacitor and to said source;
    a voltage booster having a storage capacitor and means for connecting the storage capacitor to said filter capacitor when the voltage across said filter capacitor exceeds a predetermined value so that an electrical charge is stored on said storage capacitor;
    means for coupling said booster to said comparator circuit, said comparator circuit comparing a voltage across said filter capacitor with a voltage from said source, said comparator circuit developing a first signal when the voltage across said filter capacitor exceeds said predetermined value, said comparator circuit developing a second signal when the voltage across said filter capacitor is less than said predetermined value, said filter capacitor being coupled to said booster, said second signal causing said booster to deliver a pulse of current to said filter capacitor; and
    means for transferring substantially all of said charge from said storage capacitor to said filter capacitor when the voltage booster delivers current to said filter capacitor.

2. Apparatus for providing a regulated voltage during brief power interruptions for use with a D.C. power supply which delivers current to an output filter capacitor, said apparatus comprising:
    an inductor;
    a comparator circuit;
    a constant-voltage source, said comparator circuit being connected to said filter capacitor and to said source;
    a voltage booster having first and second storage capacitors, first and second resistors, said first resistor being connected between said inductor and a first end of said first storage capacitor, said second storage capacitor being connected between said inductor and a first end of said second resistor, and a controllable rectifier having an anode, a cathode and a gate, said anode of said rectifier being connected to said first end of said first storage capacitor, said cathode of said rectifier being connected to said first end of said second resistor;
    means for coupling said booster to said comparator circuit, said comparator circuit comparing a voltage across said filter capacitor with a voltage from said source, said comparator circuit developing a first signal when the voltage across said filter capacitor exceeds a predetermined value, said comparator circuit developing a second signal when the voltage across said filter capacitor is less than said predetermined value, said inductor being connected between said voltage booster and a first end of said filter capacitor, said gate of said rectifier being coupled to said means for coupling, a second end of said filter capacitor being connected to a second end of said first storage capacitor and to a second end of said second resistor, said second signal causing said booster to deliver a pulse of current to said filter capacitor.

3. Apparatus for providing a regulated voltage during brief power interruptions for use with a D.C. power supply which delivers current to an output filter capacitor, said apparatus comprising:
    a comparator circuit;
    a constant-voltage source, said comparator circuit being connected to said filter capacitor and to said source;
    an oscillator, said oscillator being coupled to said comparator circuit, said comparator circuit comparing a voltage across said filter capacitor with a voltage from said source, said comparator circuit developing a first signal when the voltage across said filter capacitor exceeds a predetermined value, said comparator circuit developing a second signal when the voltage across said filter capacitor is less than said predetermined value, said first signal causing said oscillator to be disabled, said second signal causing said oscillator to deliver pulses of voltage;
    a sequencer; and
    a plurality of voltage boosters, said sequencer being connected between said oscillator and each of said boosters, said filter capacitor being coupled to each of said boosters, said pulses from said oscillator causing said sequencer to sequentially provide trigger signals to each of said boosters, each of said trigger signals causing one of said boosters to deliver a pulse of current to said filter capacitor.

4. Apparatus for providing a regulated voltage during brief power interruptions as defined in claim 3 wherein each of said voltage boosters includes:
    a storage capacitor; and
    means for connecting said storage capacitor to said filter capacitor when the voltage across said filter capacitor exceeds said predetermined value.

5. Apparatus for providing a regulated voltage during brief power interruptions as defined in claim 3 including:
    a storage capacitor in each of said voltage boosters;
    means for connecting said storage capacitor to said filter capacitor when the voltage across said filter capacitor exceeds said predetermined value so that an electrical charge is stored on said storage capacitor; and
    said apparatus includes means for transferring substantially all of said charge from said storage capacitor to said filter capacitor when the corresponding voltage booster delivers current to said filter capacitor.

6. Apparatus for providing a regulated voltage during brief power interruptions as defined in claim 3 including:
    an inductor, said inductor being connected between a first end of said filter capacitor and each of said voltage boosters, each of said voltage boosters including:
    first and second storage capacitors;
    first and second resistors, said first resistor being connected between said inductor and a first end of said first storage capacitor, said second storage capacitor being connected between said inductor and a first end of said second resistor; and a controllable rectifier having an anode, a cathode and a gate, said anode of said rectifier being connected to said first end of said first storage capacitor, said cathode of said rectifier being connected to said first end of said second resistor, a second end of said first storage capacitor being connected to a second end of said filter capacitor and to a second end of said second resistor, said gate of said rectifier being coupled to said sequencer.

7. Apparatus for providing a regulated voltage during brief power interruptions as defined in claim 6 including:
   first and second diodes, said first diode being connected in parallel with said first resistor, said second diode being connected in parallel with said second resistor.

8. Apparatus for providing a regulated voltage during brief power interruptions as defined in claim 3 including:
   an inductor, said inductor being connected between a first end of said filter capacitor and each of said voltage boosters, each of said voltage boosters including:
   first and second storage capacitors;
   first and second resistors, said first resistor being connected between said inductor and a first end of said first storage capacitor, said second storage capacitor being connected between said industor and a first end of said second resistor;
   a controllable rectifier having an anode, a cathode and a gate, said anode of said rectifier being connected to said first end of said first storage capacitor, said cathode of said rectifier being connected to said first end of said second resistor; and
   a transformer having a primary winding and a secondary winding, a first end of said primary winding being coupled to said sequencer, a second end of said primary winding being connected to a second end of said filter capacitor, a first end of said secondary winding being connected to said gate of said rectifier, a second end of said secondary winding being connected to said cathode of said rectifier, a second end of said first storage capacitor being connected to said second end of said filter capacitor and to a second end of said filter capacitor and to a second end of said second resistor.

9. Apparatus for providing a regulated voltage during brief power interruptions as defined in claim 5 including:
   first and second diodes, said first diode being connected in parallel with said first resistor, said second diode being connected in parallel with said second resistor.

* * * * *